United States Patent
Brennan et al.

(10) Patent No.: US 10,191,662 B2
(45) Date of Patent: Jan. 29, 2019

(54) DYNAMIC ALLOCATION OF SEGMENTS IN A FLASH STORAGE SYSTEM

(71) Applicant: Pure Storage, Inc., Mountain View, CA (US)

(72) Inventors: Timothy W. Brennan, San Francisco, CA (US); Nidhi Pankaj Doshi, Mountain View, CA (US); Xiaohui Wang, San Jose, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 15/419,900

(22) Filed: Jan. 30, 2017

(65) Prior Publication Data

US 2018/0095662 A1 Apr. 5, 2018

Related U.S. Application Data

(60) Provisional application No. 62/435,657, filed on Dec. 16, 2016, provisional application No. 62/404,099, filed on Oct. 4, 2016.

(51) Int. Cl.
*G06F 3/06* (2006.01)

(52) U.S. Cl.
CPC ............ *G06F 3/061* (2013.01); *G06F 3/0631* (2013.01); *G06F 3/0655* (2013.01); *G06F 3/0688* (2013.01)

(58) Field of Classification Search
CPC .... G06F 3/0631; G06F 3/0644; G06F 3/0655; G06F 3/0688
USPC .................................................. 711/103, 170
See application file for complete search history.

(56) References Cited

U.S. PATENT DOCUMENTS

| | | | |
|---|---|---|---|
| 5,208,813 | A | 5/1993 | Stallmo |
| 5,403,639 | A | 4/1995 | Belsan |
| 5,940,838 | A | 8/1999 | Schmuck et al. |
| 6,263,350 | B1 | 7/2001 | Wollrath et al. |
| 6,286,056 | B1 | 9/2001 | Edgar et al. |
| 6,412,045 | B1 | 6/2002 | DeKoning et al. |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

Ouyang, J. et al. (Mar. 1-5, 2014) "SDF: Software-Defined Flash for Web-Scale Internet Storage Systems", ASPLOS 2014, 14 pages.

(Continued)

*Primary Examiner* — Than Nguyen
(74) *Attorney, Agent, or Firm* — Womble Bond Dickinson (US) LLP; Daniel E. Ovanezian

(57) ABSTRACT

Apparatus and methods of operating solid-state drives in a storage system are described. A method includes adjusting, by a host controller of a storage system during run-time, storage bandwidth for a storage system process responsive to an input output (I/O) write request to write data to the storage system that includes multiple solid-state storage drives by determining an allocation share for the storage system process requesting to write the data, and responsive to determining an open segment usage by the storage system process is under the allocation share for the storage system process, opening a new segment for the storage system process.

17 Claims, 8 Drawing Sheets

(56) References Cited

U.S. PATENT DOCUMENTS

| | | |
|---|---|---|
| 6,718,448 B1 | 4/2004 | Ofer |
| 6,757,769 B1 | 6/2004 | Ofer |
| 6,799,283 B1 | 9/2004 | Tamai et al. |
| 6,804,703 B1 | 10/2004 | Allen et al. |
| 6,834,298 B1 | 12/2004 | Singer et al. |
| 6,850,938 B1 | 2/2005 | Sadjadi |
| 6,915,434 B1 | 7/2005 | Kuroda |
| 6,954,881 B1 | 10/2005 | Flynn, Jr. et al. |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,139,907 B2 | 11/2006 | Bakke et al. |
| 7,216,164 B1 | 5/2007 | Whitmore et al. |
| 7,272,674 B1 | 9/2007 | Nandi et al. |
| 7,313,636 B2 | 12/2007 | Qi |
| 7,577,802 B1 | 8/2009 | Parsons |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,103,754 B1 | 1/2012 | Luong et al. |
| 8,117,464 B1 | 2/2012 | Kogelnik |
| 8,200,887 B2 | 6/2012 | Bennett |
| 8,205,065 B2 | 6/2012 | Matze |
| 8,301,811 B1 | 10/2012 | Wigmore et al. |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,621,241 B1 | 12/2013 | Stephenson |
| 8,645,649 B2 | 2/2014 | Kaiya et al. |
| 8,700,875 B1 | 4/2014 | Barron et al. |
| 8,751,463 B1 | 6/2014 | Chamness |
| 8,806,160 B2 | 8/2014 | Colgrove et al. |
| 8,874,850 B1 | 10/2014 | Goodson et al. |
| 8,959,305 B1 | 2/2015 | Lecrone et al. |
| 9,063,937 B2 | 6/2015 | McDowell et al. |
| 9,081,713 B1 | 7/2015 | Bennett |
| 9,189,334 B2 | 11/2015 | Bennett |
| 9,294,567 B2 | 3/2016 | Hussain et al. |
| 9,311,182 B2 | 4/2016 | Bennett |
| 9,423,967 B2 | 8/2016 | Colgrove et al. |
| 9,430,412 B2 | 8/2016 | Huang |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,501,245 B2 | 11/2016 | Hussain et al. |
| 9,513,820 B1 | 12/2016 | Shalev |
| 9,516,016 B2 | 12/2016 | Colgrove et al. |
| 9,552,248 B2 | 1/2017 | Miller et al. |
| 9,565,269 B2 | 2/2017 | Malwankar et al. |
| 9,632,870 B2 | 4/2017 | Bennett |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2004/0049572 A1 | 3/2004 | Yamamoto et al. |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Ueda et al. |
| 2007/0109856 A1 | 5/2007 | Pellicone et al. |
| 2007/0113007 A1* | 5/2007 | Murayama ............ G06F 3/0608 711/114 |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0034167 A1 | 2/2008 | Sharma et al. |
| 2008/0059699 A1 | 3/2008 | Kubo et al. |
| 2008/0065852 A1 | 3/2008 | Moore et al. |
| 2008/0126734 A1* | 5/2008 | Murase ............... G06F 3/0613 711/170 |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0282045 A1 | 11/2008 | Biswas et al. |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0043958 A1* | 2/2009 | Kaneda ............... G06F 3/0604 711/112 |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2011/0072300 A1 | 3/2011 | Rousseau |
| 2011/0121231 A1 | 6/2011 | Haas et al. |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0198175 A1 | 8/2012 | Atkisson |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0019798 A1 | 1/2015 | Huang |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |

(56) References Cited

U.S. PATENT DOCUMENTS

2016/0098199 A1   4/2016  Golden et al.
2017/0024166 A1   1/2017  Singh et al.

FOREIGN PATENT DOCUMENTS

| CN | 104025010 B | 11/2016 |
|---|---|---|
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Zhang, J. et al. (2016) "Application-Aware and Software-Defined SSD Scheme for Tencent Large-Scale Storage System" 2016 IEEE 22nd International Conference on Parallel and Distributed Systems, 482-490.

"Open-Channel Solid State Drives NVMe Specification" (Apr. 2016), 24 pages.

Microsoft Corporation, "GCSettings.IsServerGC Property", Retrieved Oct. 27, 2013 via the WayBack Machine, 3 pages.

Microsoft Corporation, "Fundamentals of Garbage Collection", Retrieved Aug. 30, 2013 via the WayBack Machine, 11 pages.

\* cited by examiner

DYNAMIC ALLOCATION OF SEGMENTS IN A FLASH STORAGE SYSTEM

RELATED APPLICATIONS

The present application claims the benefit of U.S. Provisional Patent Application No. 62/404,099, filed Oct. 4, 2016, and U.S. Provisional Patent Application No. 62/435,657, filed Dec. 16, 2016 which are incorporated by reference herein.

BACKGROUND

Storage systems, such as enterprise storage systems, may include a centralized or de-centralized repository for data that provides common data management, data protection, and data sharing functions, for example, through connections to computer systems.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Systems, such as storage systems, may offload device management responsibilities from the storage drives to host controller. For example, in some systems, firmware, such as a translation layer or flash translation layer, may reside on or be executed at the drive level by the storage drive. The translation layer may maintain mappings between the logical sector addresses and physical locations. Executing the translation layer at the drive level may cause an inefficient use of storage resources, and generate increased issue from write amplification.

In implementations, a storage system may remove the translation layer from the drive-level, and perform physical flash address handling operations at the host controller-level. Performing physical flash address handling operations at the host controller-level presents challenges for designers, such as increasing the parallelism of write processes to write data onto flash-based solid state storage drives of a storage array, for example.

Aspects of the present disclosure address the above-mentioned and other deficiencies by adjusting, by a host controller of a storage system during run-time, storage bandwidth for a storage system process responsive to an input output (I/O) write request to write data to the storage system. In implementations, a host controller may determine an allocation share for the storage system process requesting to write the data. Responsive to determining an open segment usage by the storage system process is under the allocation share for the storage system process, the host controller opens a new segment for the storage system process.

Figure 1A:
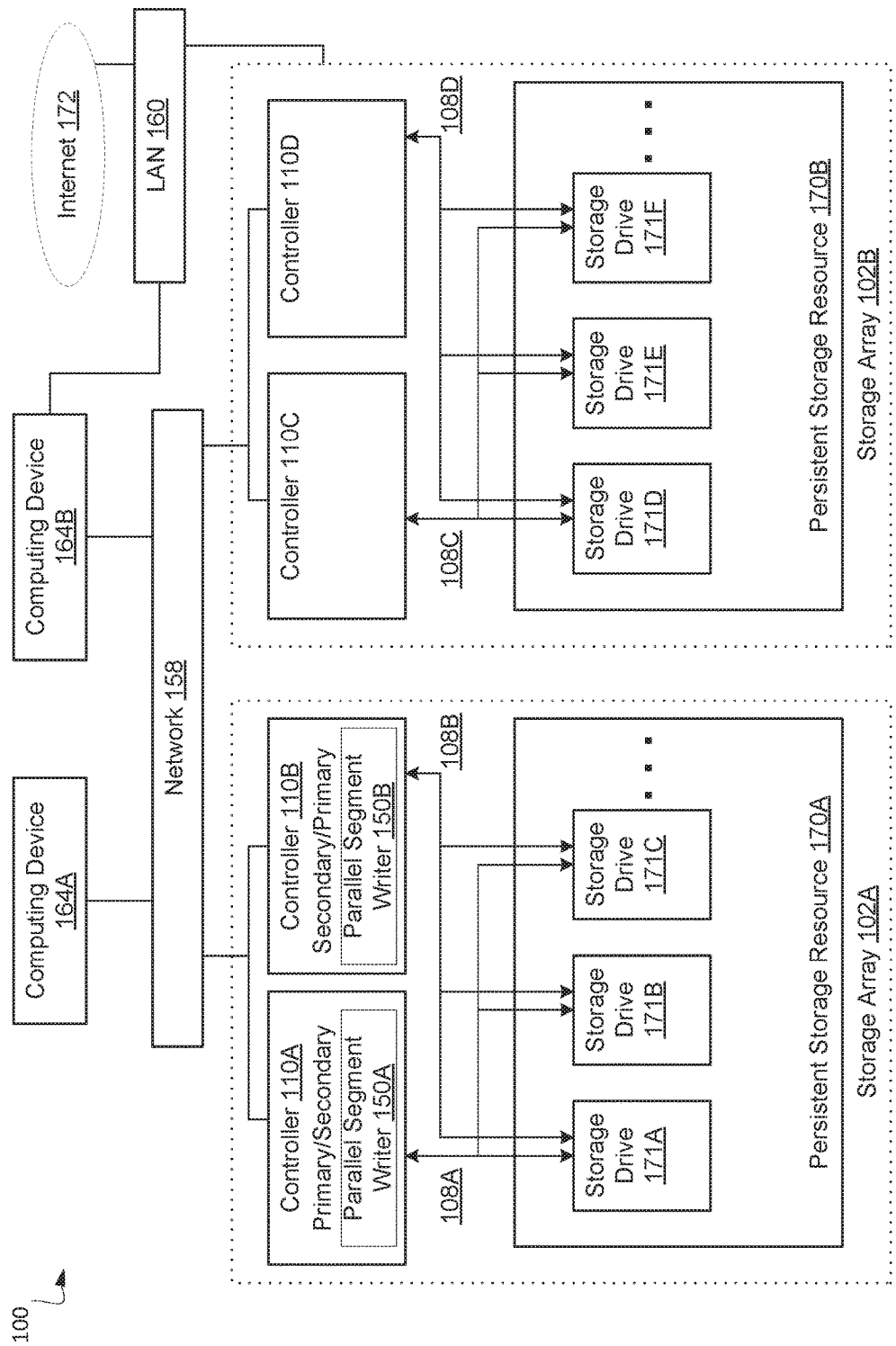
FIG. 1A illustrates an example system for data storage, in accordance with some implementations.

FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164. Computing devices (also referred to as "client devices" herein) may be for example, a server in a data center, a workstation, a personal computer, a notebook, or the like. Computing devices 164 are coupled for data communications to one or more storage arrays 102 through a network 158, such as a storage area network (SAN), or a local area network (LAN) 160.

The network 158 may be implemented as any number of physical networks, such as a LAN or SAN. The network 158 may be implemented with a variety of data communications fabrics, devices, and protocols. For example, the fabrics for network 158 may include Fibre Channel, Ethernet, Infiniband, Serial Attached Small Computer System Interface (SAS), or the like. Data communications protocols for use with network 158 may include Advanced Technology Attachment (ATA), Fibre Channel Protocol, Small Computer System Interface (SCSI), Internet Small Computer System Interface (iSCSI), HyperSCSI, Non-Volatile Memory Express (NVMe) over Fabrics, or the like. It may be noted that network 158 is provided for illustration, rather than limitation. Other data communication couplings may be implemented between computing devices 164 and storage arrays 102.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol (TCP), User Datagram Protocol (UDP), Internet Protocol (IP), Hyper-Text Transfer Protocol (HTTP), Wireless Access Protocol (WAP), Handheld Device Transport Protocol (HDTP), Session Initiation Protocol (SIP), Real Time Protocol (RTP), or the like.

Storage arrays 102 may provide persistent data storage for the computing devices 164. Storage array 102A may be contained in a chassis (not shown), and storage array 102B may be contained in another chassis (not shown), in implementations. Storage array 102A and 102B may include one or more storage array controllers 110 (also referred to as "controller" herein). A storage array controller 110 may be embodied as a module of automated computing machinery comprising computer hardware, computer software, or a combination of computer hardware and software. In some implementations, the storage array controllers 110 may be configured to carry out various storage tasks. Storage tasks may include writing data received from the computing devices 164 to storage array 102, erasing data from storage array 102, retrieving data from storage array 102 and providing data to computing devices 164, monitoring and reporting of disk utilization and performance, performing redundancy operations, such as Redundant Array of Independent Drives (RAID) or RAID-like data redundancy operations, compressing data, encrypting data, and so forth.

Storage array controller 110 and drive controllers (e.g., part of or associated with storage drives 171 and communicatively coupled to storage array controller 110) (not shown) may be implemented in a variety of ways, including as a Field Programmable Gate Array (FPGA), a Programmable Logic Chip (PLC), an Application Specific Integrated Circuit (ASIC), System-on-Chip (SOC), or any computing device that includes discrete components such as a processing device, central processing unit, computer memory, or various adapters. Storage array controller 110 may include, for example, a data communications adapter configured to support communications via the network 158 or LAN 160. In some implementations, storage array controller 110 may be independently coupled to the LAN 160. In implementations, storage array controller 110 may include an I/O controller or the like that couples the storage array controller 110 for data communications, through a midplane (not shown), to a persistent storage resource 170 (also referred to as a "storage resource" or "shelf" herein). The persistent storage resource 170 main include any number of storage drives 171 (also referred to as "storage devices" or "storage modules" herein) and any number of non-volatile Random Access Memory (NVRAM) devices (not shown).

In some implementations, the NVRAM devices of a persistent storage resource 170 may be configured to receive, from the storage array controller 110, data to be stored in the storage drives 171. In some examples, the data may originate from computing devices 164. In some examples, writing data to the NVRAM device may be carried out more quickly than directly writing data to the storage drive 171. In implementations, the storage array controller 110 may be configured to utilize the NVRAM devices as a quickly accessible buffer for data destined to be written (e.g., flushed) to the storage drives 171. Latency for write requests using NVRAM devices as a buffer may be improved relative to a system in which a storage array controller 110 writes data directly to the storage drives 171. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171.

In implementations, storage drive 171 may refer to any device configured to record data persistently, where "persistently" or "persistent" refers as to a device's ability to maintain recorded data after loss of power. In some implementations, storage drive 171 may correspond to non-disk storage media. For example, the storage drive 171 may be one or more solid-state drives (SSDs), flash memory based storage, any type of solid-state non-volatile memory, or any other type of non-mechanical storage device. In other implementations, storage drive 171 may include mechanical or spinning hard disk, such as hard-disk drives (HDD). In implementations, a storage drive 171 may contain one or more physical packages (e.g., packages with pins to connect to a circuit board) where each physical package contains one or more non-volatile memory die.

In some implementations, the storage array controllers 110 may be configured for offloading device management responsibilities from storage drive 171 in storage array 102. For example, storage array controllers 110 may manage control information that may describe the state of one or more memory blocks in the storage drives 171. The control information may indicate, for example, that a particular memory block has failed and should no longer be written to, that a particular memory block contains boot code for a storage array controller 110, the number of program-erase (P/E) cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171 may be stored in one or more particular memory blocks of the storage drives 171 that are selected by the storage array controller 110. The selected memory blocks may be tagged with an identifier indicating that the selected memory block contains control information. The identifier may be utilized by the storage array controllers 110 in conjunction with storage drives 171 to quickly identify the memory blocks that contain control information. For example, the storage controllers 110 may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171.

In implementations, storage array controllers 110 may offload device management responsibilities from storage drives 171 of storage array 102 by retrieving, from the storage drives 171, control information describing the state of one or more memory blocks in the storage drives 171. Retrieving the control information from the storage drives 171 may be carried out, for example, by the storage array controller 110 querying the storage drives 171 for the location of control information for a particular storage drive 171. The storage drives 171 may be configured to execute instructions that enable the storage drive 171 to identify the location of the control information. The instructions may be executed by a controller (not shown) associated with or otherwise located on the storage drive 171 and may cause the storage drive 171 to scan a portion of each memory block to identify the memory blocks that store control information for the storage drives 171. The storage drives 171 may respond by sending a response message to the storage array controller 110 that includes the location of control information for the storage drive 171. Responsive to receiving the response message, storage array controllers 110 may issue a request to read data stored at the address associated with the location of control information for the storage drives 171.

In other implementations, the storage array controllers 110 may further offload device management responsibilities from storage drives 171 by performing, in response to receiving the control information, a storage drive management operation. A storage drive management operation may include, for example, an operation that is typically performed by the storage drive 171 (e.g., the controller (not shown) associated with a particular storage drive 171). A storage drive management operation may include, for example, ensuring that data is not written to failed memory blocks within the storage drive 171, ensuring that data is written to memory blocks within the storage drive 171 in such a way that adequate wear leveling is achieved, and so forth.

In implementations, storage array 102 may implement two or more storage array controllers 110. In some implementations, storage array 102 may implement multiple host controllers in a multi-host storage system. For example, storage array 102A may include storage array controllers 110A and storage array controllers 110B (also referred to as "host controller 110A" and "host controller 110B" respectively, herein). At a given instance, a single storage array controller 110 (e.g., storage array controller 110A) of a storage system 100 may be designated with primary status (also referred to as "primary controller" or "primary host controller" herein), and other storage array controllers 110 (e.g., storage array controller 110A) may be designated with secondary status (also referred to as "secondary controller" or "secondary host controller" herein). The status of storage array controllers 110 may change during run-time. For example, storage array controller 110A may be designated with secondary status, and storage array controller 110B may be designated with primary status.

In implementations, the primary controller may have a particular access (e.g., access rights) to persistent storage resource 170, such as permission to alter data (e.g., write) in persistent storage resource 170 while excluding the same access to the secondary controller. In some implementation, the access rights may include write access, read access, erase access, or read-write access. It may be noted that different access rights may also be implemented, such as write exclusive access, exclusive access, write exclusive access—registrants only, exclusive access-registrants only, write exclusive access—all registrants, exclusive access—all registrants, for example. In implementations, at least some of the access rights of the primary controller may supersede the rights of the secondary controller. For instance, the secondary controller may not have permission to write data in persistent storage resource 170 when the primary controller has the write access.

In some implementations, a primary controller, such as storage array controller 110A, may serve as the primary controller for one or more storage arrays 102, and a second controller, such as storage array controller 110B, may serve as the secondary controller for the one or more storage arrays 102. For example, storage array controller 110A may be the primary controller for storage array 102A and storage array 102B, and storage array controller 110B may be the secondary controller for storage array 102A and 102B. In some implementations, a primary controller, such as storage array controller 110A, may serve as the primary controller for one or more storage drives 171 of storage arrays 102, and a second controller, such as storage array controller 110B, may serve as the primary controller for one or more storage drives 171 of storage arrays 102 for which storage array controller 110A does not have primary status. It may be noted that in implementations, either storage array controller 110A or storage array controller 110B may be the primary controller for a particular storage drive 171, but not both. Both storage array controller 110A and storage array controller 110B having primary status with respect to a particular storage drive 171 or storage array may result in corruption of data, for example.

In some implementations, storage array controllers 110C and 110D (also referred to as "storage processor modules" or "storage controller" herein) may neither have primary or secondary status. Storage array controllers 110C and 110D, implemented as storage processor modules, may act as a communication interface between the primary and secondary controllers (e.g., storage array controllers 110A and 110B, respectively) and storage array 102B. For example, storage array controller 110A of storage array 102A may send a write request, via network 158, to storage array 102B. The write request may be received by both storage array controllers 110C and 110D of storage array 102B (e.g., multi-path). Storage array controllers 110C and 110D may facilitate the communication, e.g., send the write request to the appropriate storage drive 171. It may be noted that in some implementations storage processor modules may be used to increase the number of storage drives controlled by the primary and secondary controllers.

In implementations, storage array controllers 110 are communicatively coupled, via a midplane (not shown), to one or more storage drives 171 and to one or more NVRAM devices (not shown) that are included as part of a storage array 102. The storage array controllers 110 may be coupled to the midplane via one or more data communications links and the midplane may be coupled to the storage drives 171 and the NVRAM devices via one or more data communications links. The data communications links described above are collectively illustrated by data communications links 108 and may include a Peripheral Component Interconnect Express (PCIe) bus, for example.

In some implementations, a storage drive 171 includes one or more ports (not shown) (e.g., multiport storage drive). A port may be coupled to a respective storage array controller 110 outside storage drive 171. For example, a first port of storage drive 171A may be coupled to storage array controller 110A via data communications link 108A. A second port of storage drive 171A may be coupled to storage array controller 110B via data communications link 108B. Internal to storage drives 171, a particular port may be associated with a particular drive controller (not shown). For example, a dual port storage drive may have two drive controllers, where each drive controller is associated with a particular port. Ports may transmit data to and from the associated drive controllers. In implementations, communications between storage array controllers 110A and 100B and the respective driver controllers may be compatible with a non-fabric-based standard, such as the NVMe standard.

In implementations, communications in system 100 may travel multiple stages using different protocols. For example, a communication, such as a reservation (e.g., for access rights to a storage drive 171) is sent by storage array controller 110A to storage array controller 110C (stage 1). Storage array controller 110C may send a modified communication to storage drive 171D (stage 2). In implementations, the protocols between the stages may be different from one another. For example, in stage 1 the storage array controller 110A may communicate to storage array controller 110C over a fabric-based network using a fabric-based protocol. The network may be fabric-based network using data formats compatible with a particular fabric standard, such as NVMe over Fabrics. In stage 2, storage array controller 110C may communicate to storage drive 171D using a non-fabric protocol. For example, storage array controller 110C may receive a communication, modify the communication, and send the modified communication to storage drive 171D via data communications link 108C using a non-fabric protocol, such as NVMe.

In some implementations, system 100 may be designed with principles of high availability (HA) architecture. High availability may refer to systems that are durable and designed to operate continuously by accommodating for failure using redundant components. For example, a multi-host storage system using controller 110A and 110B may accommodate the failure of one controller (e.g., controller 110A or controller 110B) and continuously perform the designated operations for system 100. Similarly, implementing multiple storage processor modules, such as storage array controller 110C and storage array controller 110B, may accommodate the failure of one of the storage processor modules.

In other implementations, the storage array controllers 110 may still further offload device management responsibilities from storage drives 171 by performing some or all the operations handled by the firmware associated with storage drive 171. For example, in some storage systems, a firmware associated with each storage drive 171 may also be referred to as "flash translation layer" (FTL). An instance of the FTL may be included and executed on each storage drive 171. The FTL may maintain mappings between the logical sector addresses and physical locations associated with non-volatile memory devices of a storage drive 171.

In some implementations, the FTL may be removed from the storage drive level. In implementations, a host controller, such as storage array controller 110A and 110B, may control the allocation of data blocks (e.g., segments) to the physical layer, with or without using logical address mapping. In some implementations, storage array controller 110A and 110B store data to storage drive 171 using physical memory addresses, and without logical address mapping, to particular physical locations. Physical flash address handling operations, performed by storage array controller 110A and 110B, may control the location data is stored in storage drive 171 to the physical level. In implementations, parallel segment writer 150 of storage array controller 110A and 110B may directly map data to physical storage without using a translation layer. It may be noted that an instance of parallel segment writer 150A may be executed by storage array controller 110A, and another instance of parallel segment writer 150B may be executed by storage array controller 110B, in implementations.

In implementations, the storage drive 171 may be one or more solid-state drives (SSDs), such as flash-based storage drives. An SSD may include one of more non-volatile memory devices or chips where the non-volatile memory devices may be individually packaged and electrically coupled or physically mounted to a circuit board and to other components of storage drive 171. Examples of non-volatile memory devices may include flash memory devices, such as Not AND (NAND) devices or Not OR (NOR) devices, for example. A non-volatile memory device may include one or more independent dies where each die may run in parallel (e.g., perform operations such as read, write, erase in parallel). Each die of a non-volatile memory device has multiple erase blocks, wherein the memory cells of an erase block are in physical locality. In some implementations, an erase block may be a minimum erasable unit of a die that can be erased in a single erase operation. An erase block may be subdivided into pages. In some implementations, a page may be a minimum unit of a die that can be programmed in a single operation. In some implementations, a page is erased at some point before being written, and an entire erase block is erased in a single operation. In some implementations, the pages of an erase block may be written serially.

In implementations, the parallel segment writer 150 may adjust, during run-time, storage bandwidth for a storage system process, as described herein. In implementations, run-time may refer to a period of time during which a program or system is running (e.g., executing). For example, the parallel segment writer 150 may adjust the storage bandwidth for the storage system process concurrently with the storage system process being executed by the storage system 100 and concurrently with the storage system 100 writing data to the storage drives 171 for another storage system process, for example. In implementations, storage bandwidth (also referred to as "parallelism" or "storage write bandwidth" herein) may refer to an amount of concurrently open segments for a storage system process or storage system, or refer an amount of data that may be written to one or more storage arrays 102 in parallel or concurrently. As noted above, non-volatile memory devices may include one or more independent dies where each die may run in parallel (e.g., perform operations such as read, write, erase in parallel). The number of dies per storage drive 171 times the number of storage drives 171 may approximate a theoretical amount of parallelism a storage system may achieve. In implementations, the number of open segments may be adjusted for any given storage system process during run-time. A segment may refer to a logical data unit on which a write operation is performed. In implementations, an open segment may refer to a segment that has been allocated to a storage system process and has available storage space to write data. In implementations, after an open segment is filled with data, the segment may be closed (e.g., closed segment).

It may be noted that readers will appreciate that the storage systems, such as system 100, and the components that are contained in such storage systems, as described in the present disclosure, are included for explanatory purposes and do not represent limitations as to the types of systems that may accumulate application-level statistics. In fact, storage systems configured for accumulating application-level statistics may be embodied in many other ways and may include fewer, additional, or different components. For example, storage within storage systems configured for accumulating application-level statistics may be embodied as block storage where data is stored in blocks, and each block essentially acts as an individual hard drive. Alternatively, storage within storage systems configured for accumulating application-level statistics may be embodied as object storage, where data is managed as objects. Each object may include the data itself, a variable amount of metadata, and a globally unique identifier, where object storage can be implemented at multiple levels (e.g., device level, system level, and interface level). In addition, storage within storage systems configured for accumulating application-level statistics may be embodied as file storage in which data is stored in a hierarchical structure. Such data may be saved in files and folders, and presented to both the system storing it and the system retrieving it in the same format. Such data may be accessed using the Network File System ('NFS') protocol for Unix or Linux, Server Message Block ('SMB') protocol for Microsoft Windows, or in some other manner.

Figure 1B:
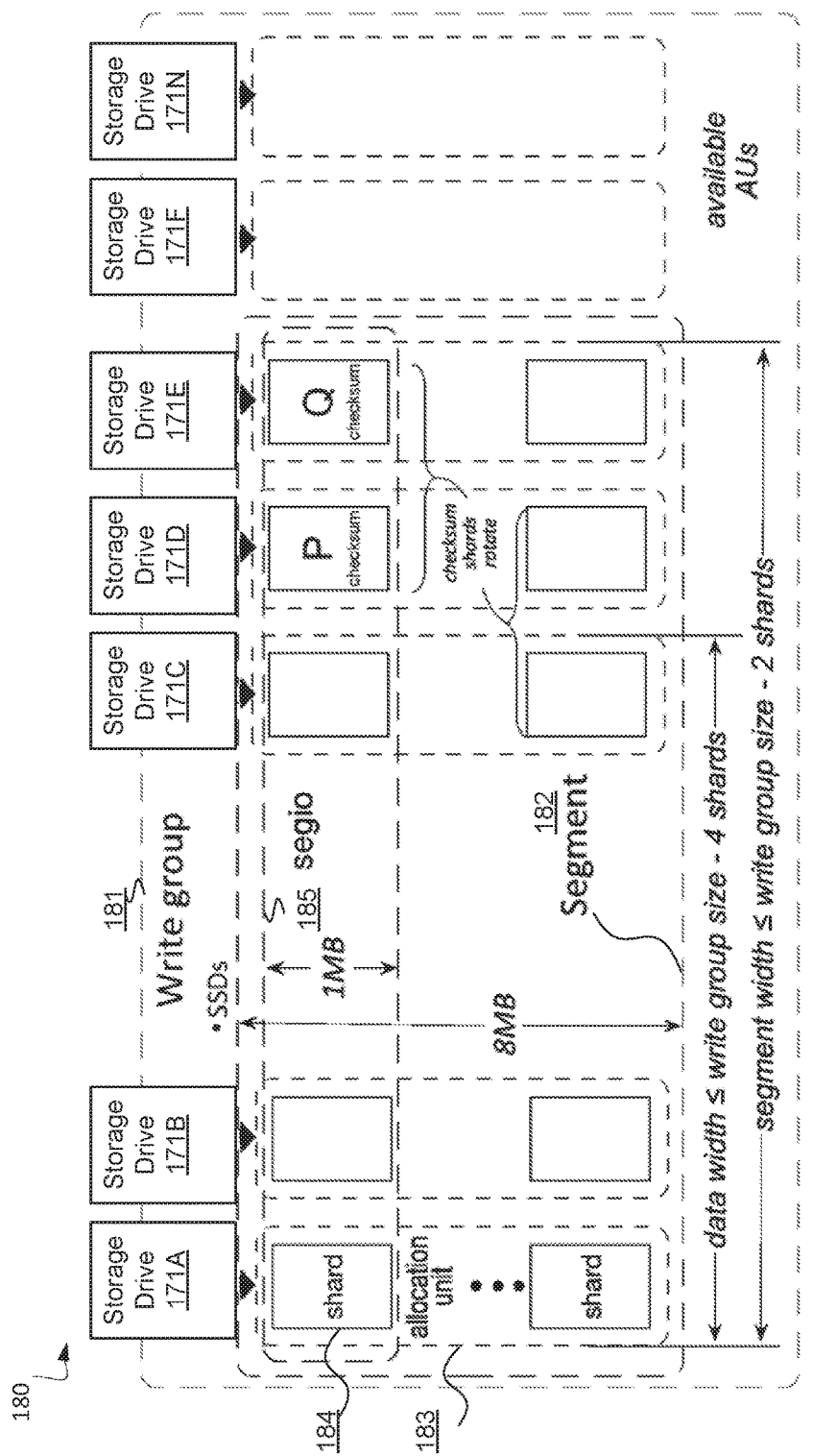
FIG. 1B illustrates an example segment layout for a storage system, in accordance with some implementations.

FIG. 1B illustrates an example segment layout for a storage system, in accordance with some implementations. For clarity of discussion, elements described with respect to FIG. 1A are used to describe elements of FIG. 1B. In implementations, host controllers, such as storage array controller 110A and 110B, may be connected and access a wide number of storage drives 171. For example, the host controller may access 10 to 100's of different storage drives 171. In implementations, a storage system may organize the storage drives 171 in write groups 181. For example, a storage system may RAID-protect (Redundant Array of Independent Disks) and write data in segments 182 that consist of allocation units 183 (AU) located on a subset of storage drives 171 within a write group 181. It may be appreciated that although only one segment 182 is illustrated, one or more segments may be available or open in the same or different write group 181.

In implementations, storage drives 171 present logical block address spaces (or similar) of number sectors (e.g., 512 byte sectors) to storage array controllers 110 (e.g., storage array controller 110A and 110B). A storage system may manage each storage drive's LBA space in N Megabyte (MB) blocks (e.g., 8 MB) of logically contiguous LBAs, also referred to as allocation units 183. In implementations, storage array controller 110 may align allocation units 183 with the storage drives' internal storage organization to optimize performance and minimize media wear, for example. An allocation unit 183 may refer to a logical unit of allocation for a storage drive 171 (e.g., an allocation unit (AU) may be a minimum allocation granularity (e.g., 8 MB) for a specific storage drive 171). In other implementations, an allocation unit 183 may be larger than the minimum allocation granularity for storage drive 171 or be variable sizes. In implementations, each allocation unit 183 of a segment 182 may be stored in a different storage drive 171. In implementations, an allocation unit 183 may be the size of an erase block or larger.

In implementations, a storage system may allocate physical storage in segments 182. A segment may refer to a logical data unit on which a write operation is performed, where the write operation stores data of the segment across one or more storage drives 171. In implementations, a segment 182 may include several allocation units 183, where each allocation unit 183 is on a different storage drive 171 of the same write group 181. In implementations, an allocation unit 183 in a segment 182 may be located on any allocation unit 183 boundary in a respective storage drive's LBA space. In some examples, a segment may include 8 to 10 allocation units 183.

In implementations, the storage system may treat each allocation unit 183 in a segment 182 as a column of N-MB (e.g., 1 MB) shards 184. In implementations, within a segment 182, each storage drive 171 may be atomically written in shards 184 (e.g., 1 MB). In implementations, a storage system may treat a shard 184 as a column of logical pages that align with physical pages of storage drive 171.

In implementations, the corresponding shards 184 in each of a segment's allocation units 183 may be collectively referred to as a segio 185 (also referred to as a "write unit"). In implementations, the segio 185 may be a unit in which a storage system packs data before writing to storage drives 171. For example, a horizontal stripe of shards 184 across the segment 182 (e.g., segio 185) may accumulate user data from the frontend and data from the storage system processes from the backend. When the two sections meet, a segio 185 is completed and marked for flush (e.g., write) to storage drive 171. In implementations, multiple segios 185 may be used to fill a segment 182.

Figure 2:
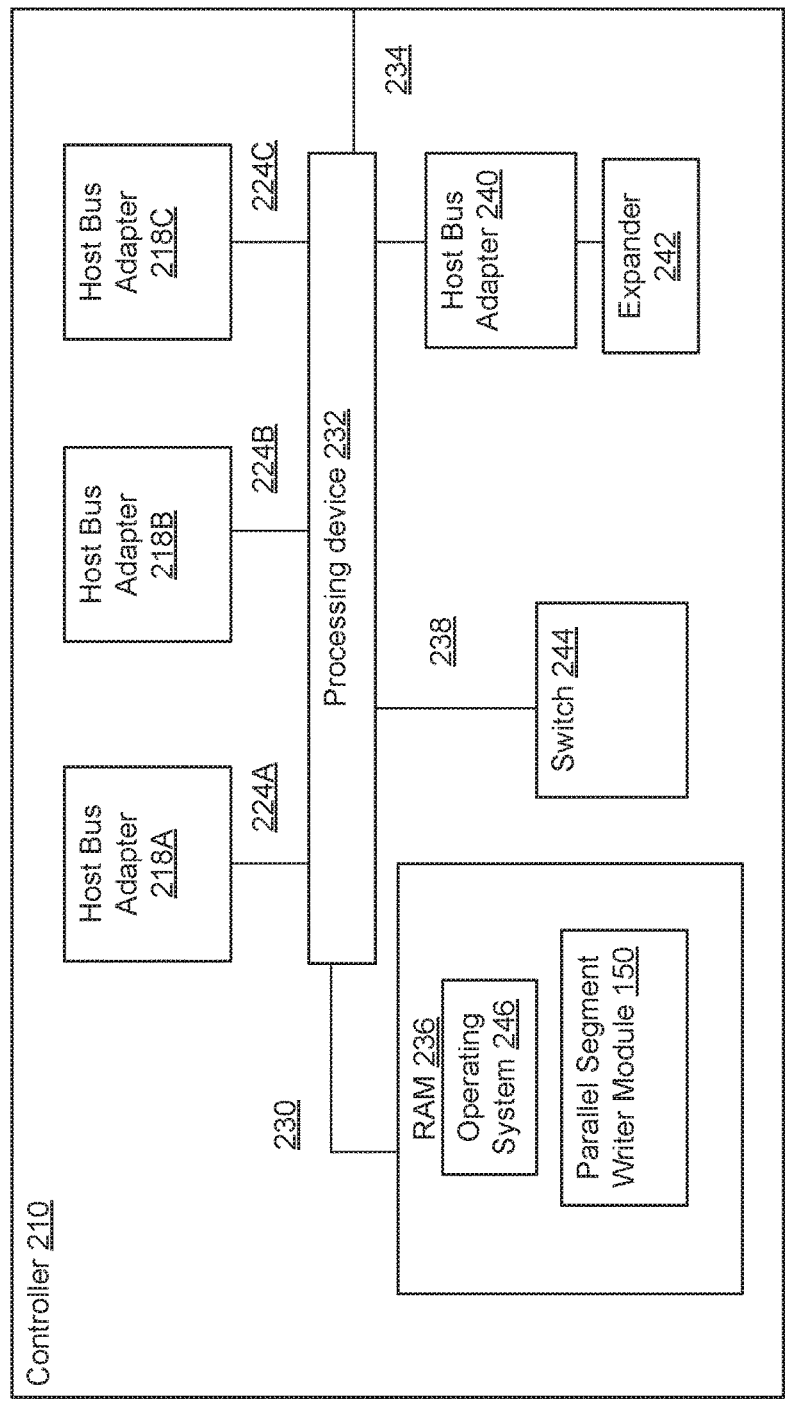
FIG. 2 illustrates an example system for data storage, in accordance with some implementations.

FIG. 2 illustrates an example system for data storage, in accordance with some implementations. Storage array controller 210 illustrated in FIG. 2 may similar to the storage array controllers 110 described with respect to FIG. 1. In one example, storage array controller 210 may be similar to storage array controller 110A or storage array controller 110B. Storage array controller 210 includes numerous elements for purposes of illustration rather than limitation. It may be noted that storage array controller 210 may include the same, more, or fewer elements configured in the same or different manner in other implementations. It may be noted that elements of FIG. 1 may be included below to help illustrate features of storage array controller 210.

Storage array controller 210 may be or include one or more processing devices 232 and random access memory (RAM) 236. Processing device 232 (or controller 210) represents one or more general-purpose processing devices such as a microprocessor, central processing unit, or the like. More particularly, the processing device 232 (or controller 210) may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 232 (or controller 210) may also be one or more special-purpose processing devices such as an application specific integrated circuit (ASIC), a field programmable gate array (FPGA), a digital signal processor (DSP), network processor, or the like.

The processing device 232 may be connected to the RAM 236 via a data communications link 230, which may be embodied as a high speed memory bus such as a Double-Data Rate 4 (DDR4) bus. Stored in RAM 236 is an operating system 246. In some implementations, an array management module 248 is stored in RAM 236. Parallel segment writer 150 may include computer program instructions for offloading device management responsibilities from a storage drive. In implementations, parallel segment writer 150 may be configured to adjust, during run-time, storage bandwidth for a storage system process responsive to an input output (I/O) write request to write data to a storage system that comprises a plurality of solid-state storage drives. In implementations, parallel segment writer 150 adjusts the storage bandwidth for a storage system process by determining an allocation share for the storage system process requesting to write the data to the storage system. Responsive to determining an open segment usage by the storage system process is under the allocation share for the storage system process, the parallel segment writer 150 may open a new segment for the storage system process. Additional details of parallel segment writer 150 may be described below with respect to FIG. 3-6.

It may be noted that the parallel segment writer 150 and the operating system 246 shown in RAM 236 for purposes of illustration, rather than limitation. Many components of parallel segment writer 150 or the operating system 246 may also be stored in non-volatile memory such as, for example, persistent storage resource 170 described with respect to FIG. 1.

In implementations, storage array controller 210 includes one or more host bus adapters 218 that are coupled to the processing device 232 via a data communications link 224. In implementations, host bus adapters 218 may be computer hardware that connects a host system (e.g., the storage array controller) to other network and storage arrays. In some examples, host bus adapters 218 may be a Fibre Channel adapter that enables the storage array controller 210 to connect to a SAN, an Ethernet adapter that enables the storage array controller 210 to connect to a LAN, or the like. Host bus adapters 218 may be coupled to the processing device 232 via a data communications link 224 such as, for example, a PCIe bus.

In implementations, storage array controller 210 may include a host bus adapter 240 that is coupled to an expander 242. The expander 242 may be used to attach a host system to a larger number of storage drives. The expander 242 may, for example, be a SAS expander utilized to enable the host bus adapter 240 to attach to storage drives in an implementation where the host bus adapter 240 is embodied as a SAS controller.

In implementations, storage array controller 210 may include a switch 244 coupled to the processing device 232 via a data communications link 238. The switch 244 may be a computer hardware device that can create multiple endpoints out of a single endpoint, thereby enabling multiple devices to share a single endpoint. The switch 244 may, for example, be a PCIe switch that is coupled to a PCIe bus (e.g., data communications link 238) and presents multiple PCIe connection points to the midplane.

In implementations, storage array controller 210 includes a data communications link 234 for coupling the storage array controller 210 to other storage array controllers. In some examples, data communications link 234 may be a QuickPath Interconnect (QPI) interconnect.

Figure 3:
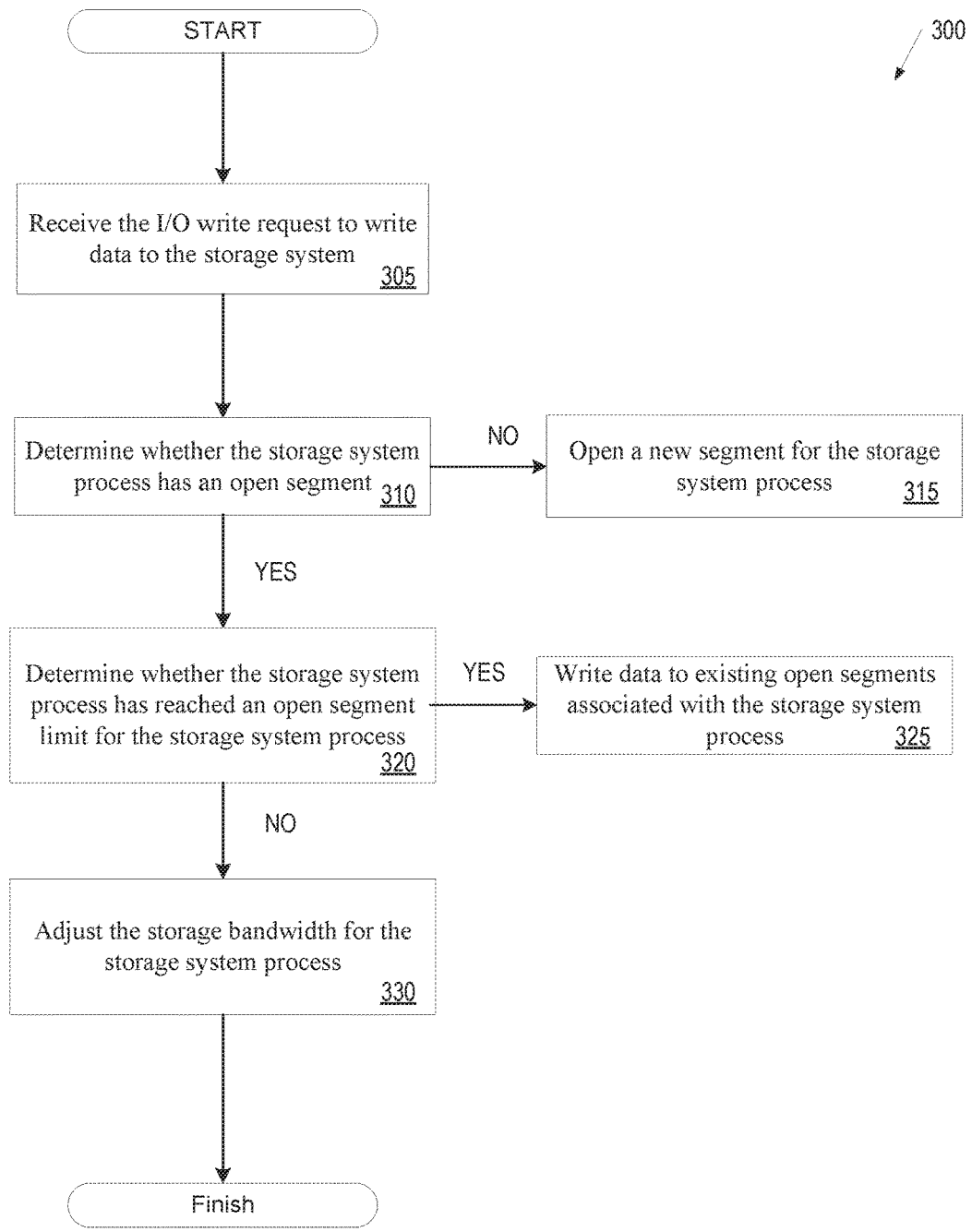
FIG. 3 is a flow diagram illustrating a method for determining whether to adjust storage bandwidth for a storage system process, in accordance with some implementations.
Figure 6:
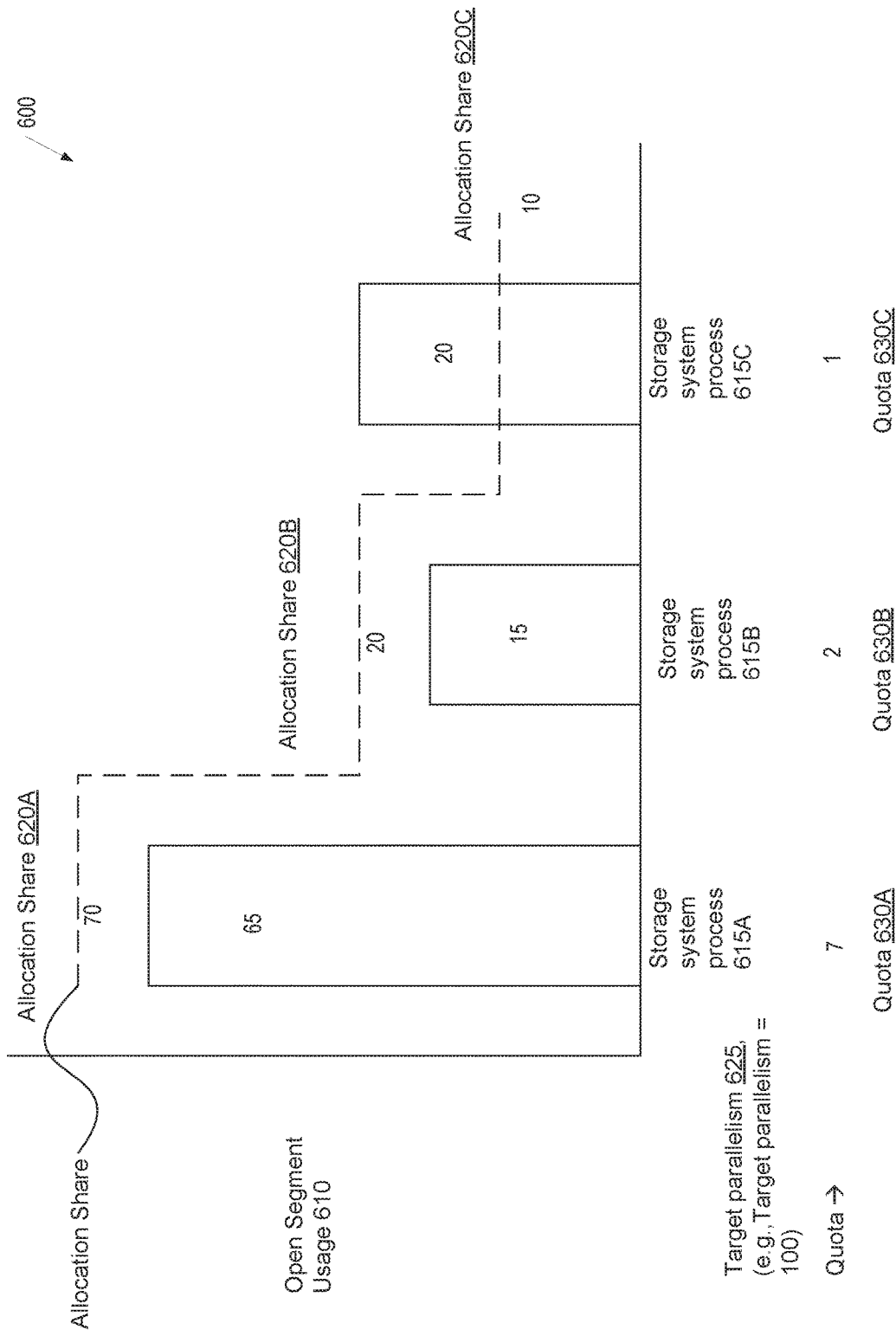
FIG. 6 is a diagram illustrating parameters for determining allocation share for the storage system processes, in accordance with some implementations.

FIG. 3 is a flow diagram illustrating a method for determining whether to adjust storage bandwidth for a storage system process, in accordance with some implementations. Method 300 may be performed by processing logic that includes hardware (e.g., circuitry, dedicated logic, programmable logic, microcode), software (e.g., instructions run on a processing device to perform hardware simulation), or a combination thereof. In some implementations, parallel segment writer 150 of storage array controllers 110A and 110C may perform some or all the operations described herein. Multiple operations are presented for illustration, rather than limitation. In implementations, some, none, or all the operations may be performed. It may be noted that elements of FIGS. 1A-B and FIG. 6 may be used to describe method 300. FIG. 6 is a diagram 600 illustrating parameters for determining allocation share for the storage system processes, in accordance with some implementations. It may be noted that the values used in conjunction with FIG. 6 are for purposes of illustration, rather than limitation.

Method 300 begins at block 305 where processing logic executing method 300 receives the input-output write request to write data to the storage system 100 from the storage system process (e.g., storage system processes 615A of FIG. 6). In implementations, an I/O write request may be an I/O command received by storage array controller 110A or 110B and sent by a storage system process. In implementations, a storage system process (also referred to as a "client process" herein) may refer to a particular writer or client (e.g., application or sub-application (such as a plug-in) that performs operations in a system, such as storage system 100. In implementations, the storage system processes may include background processes or frontend processes performed by a storage system 100. For example, background storage system processes may include a garbage collection (GC) process, a flush process, a replication process, a deduplication process, or a pyramid process (e.g., metadata for a log structure database), among other storage system processes. Font-end processes may include storing files or data on behalf of client devices, such as computing devices 164.

At block 310, processing logic determines whether the storage system process has an open segment (e.g., segment 182 of FIG. 1B). In implementations, once a segment is associated with a particular storage system process, the segment remains associated with the particular storage system process after the segment is closed. It may be appreciated that a segment may be re-associated with other storage system processes from time to time. For example, the data from a particular segment associated with a particular storage system process may be erased and the segment re- opened for a different storage system process (or the same storage system process). In implementations, a segment that is associated with a particular storage system process is filled with data from the particular storage system process, and not from other storage system processes.

At block 315, responsive to determining the storage system process does not have an open segment, processing logic opens a new segment for the storage system process. It may be noted that in implementations, a storage system process that does not have at least one open segment will not be "starved" and will be allocated an open segment.

In an alternative implementation, at block 320 responsive to determining the storage system process does have an open segment, processing logic may determine whether the storage system process has reached an open segment limit for the storage system process. In implementations, an open segment limit (also referred to as "maximum span limit" herein) may be a maximum number of open segments that may be opened on behalf of particular storage system process. In implementations, the open segment limit may be set by an administrator. Processing logic may compare the number of open segments for a particular process (e.g., open segment usage 610 for storage system process 615 of FIG. 6) to the open segment limit for the storage system process to make the determination. Responsive to determining the storage system process has met the associated open segment limit, processing logic may move to block 325 and write the data to existing open segments associated with the storage system process. Responsive to determining the storage system process has not met the associated open segment limit, processing logic may move to block 330 and adjust the storage bandwidth for the storage system process (e.g., adjust the number of open segments for the storage system process). In other implementations, processing logic may move directly from block 310 to block 330.

Figure 4:
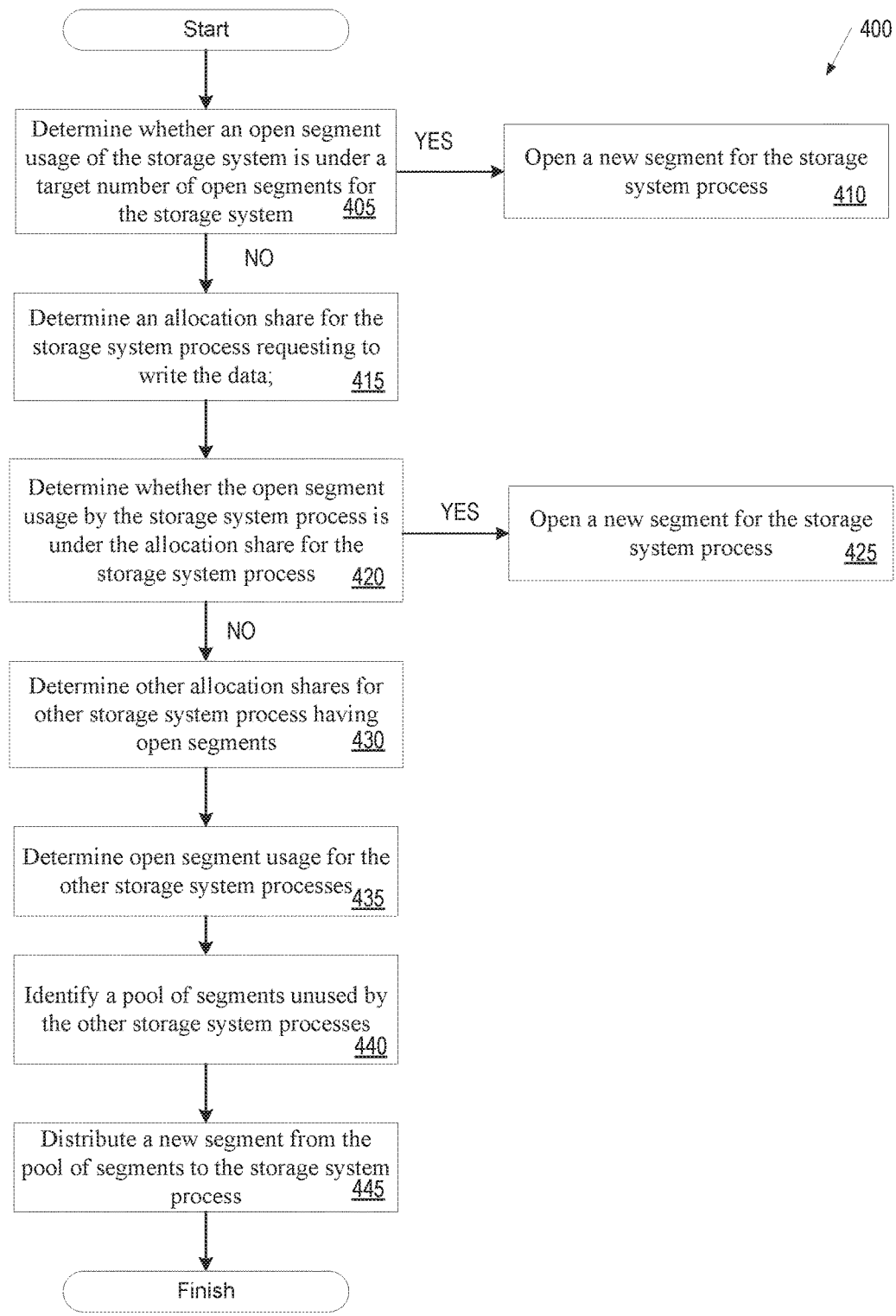
FIG. 4 is a flow diagram illustrating a method for adjusting storage bandwidth for a storage system process, in accordance with some implementations.

FIG. 4 is a flow diagram illustrating a method for adjusting storage bandwidth for a storage system process, in accordance with some implementations. Method 400 may be performed by processing logic that includes hardware (e.g., circuitry, dedicated logic, programmable logic, microcode), software (e.g., instructions run on a processing device to perform hardware simulation), or a combination thereof. In some implementations, parallel segment writer 150 of storage array controllers 110A and 110C may perform some or all the operations described herein. Multiple operations are presented for illustration, rather than limitation. In implementations, some, none, or all the operations may be performed. It may be noted that elements of FIGS. 1A-B and FIG. 6 may be used to describe method 400.

Method 400 begins at block 405 where processing logic executing method 400 determines whether an open segment usage (e.g., open segment usage 610 of FIG. 6) of the storage system 100 is under a target number of open segments (also referred to as "target parallelism" herein, such as target parallelism 625 of FIG. 6) for the storage system 100. Open segment usage may refer the number of open segments actively open at any given instance by the storage system or a particular storage system process. The open segment usage of the storage system may refer to the total open segments for all storage system processes (e.g., a predetermined group of process) active in storage system. It may be noted that a storage system process may be idle and have not open segments. An idle storage system process may not be used in the calculation of open segment usage (or contribute 0 to the value). The target parallelism (or target number of open segments for the storage system) may refer to a predetermined soft target amount of open segments that are allocated at any given time in the storage system. In one example, the target parallelism may be the number of dies per storage drive 171 times the number of write groups 181 controlled by particular host controllers, such as storage array controller 110A and 110B. It may be noted that the actual open segment usage for the storage system may be the same, higher, or lower than the target parallelism. In one example, to determine whether the open segment usage of the storage system is under a target number of open segments for the storage system, the storage system may subtract the open segment usage from the target parallelism. A remainder greater than 1 is indicative that the open segment usage of the storage system is under the target number of open segments for the storage system. A remainder equal to or less than 1 (e.g., oversubscribed) is indicative that the open segment usage of the storage system is not under the target number of open segments for the storage system.

At block 410, responsive to determining the open segment usage of the storage system is under the target number of open segments for the storage system, processing logic opens a new segment for the storage system process. Responsive to determining the open segment usage of the storage system is not under the target number of open segments for the storage system (e.g., fully or over-subscribed), processing logic moves to block 415 and determines an allocation share (e.g., allocation share 620, also referred to as "fair share") for the storage system process requesting to write the data. An allocation share may refer to a varying target number of open segments for a given storage system process at a given instance, where the allocation share is tunable at runtime. Operations of block 415 may be further described with respect to FIG. 5.

Figure 5:
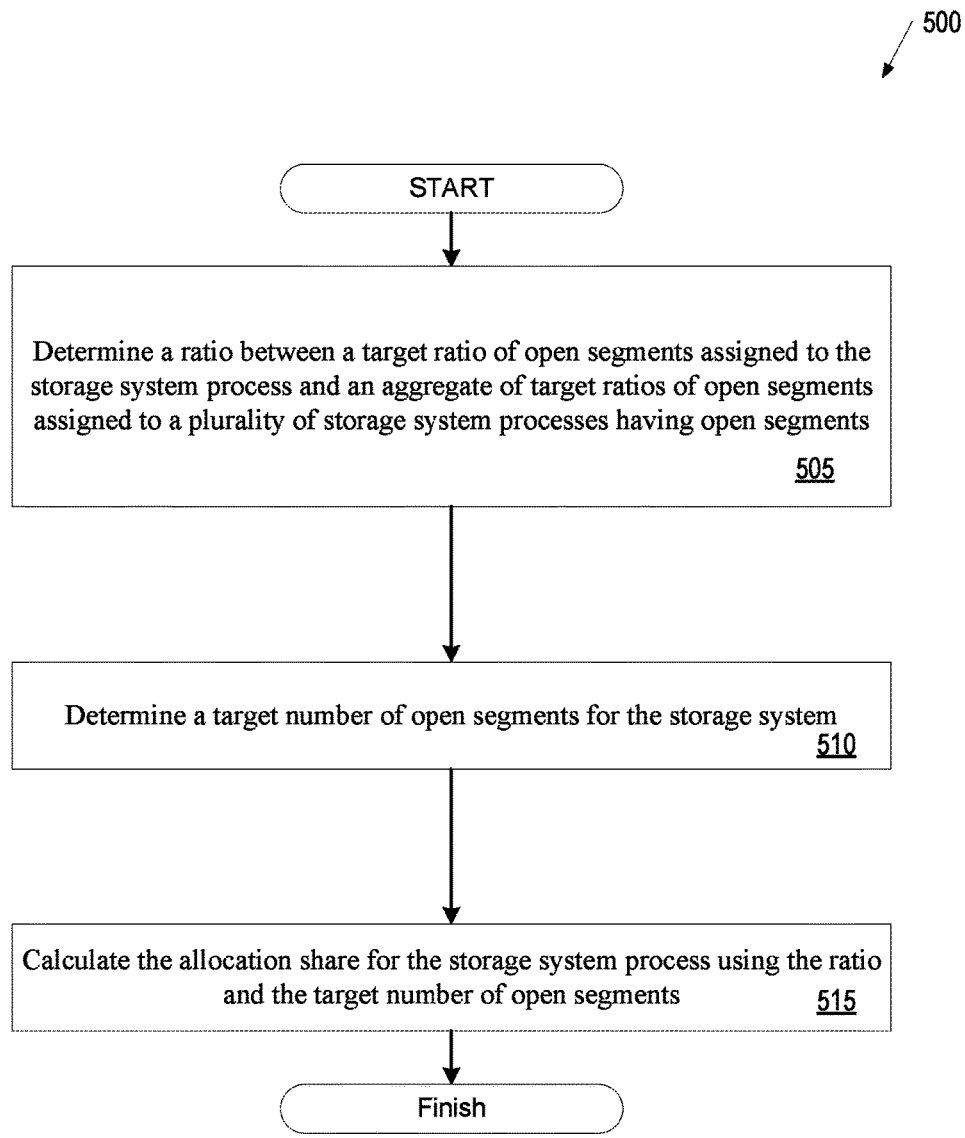
FIG. 5 is a flow diagram illustrating a method for determining an allocation share for a storage system process, in accordance with some implementations.

FIG. 5 is a flow diagram illustrating a method for determining an allocation share for a storage system process, in accordance with some implementations. Method 500 may be performed by processing logic that includes hardware (e.g., circuitry, dedicated logic, programmable logic, microcode), software (e.g., instructions run on a processing device to perform hardware simulation), or a combination thereof. In some implementations, parallel segment writer 150 of storage array controllers 110A and 110C may perform some or all the operations described herein. Multiple operations are presented for illustration, rather than limitation. In implementations, some, none, or all the operations may be performed. It may be noted that elements of FIGS. 1A-B and FIG. 6 may be used to describe method 500.

Method 500 begins at block 505 where processing logic executing method 500 determines a ratio between a target ratio (e.g., quota, such as quota 630A of FIG. 6) of open segments assigned to the storage system process and an aggregate of target ratios (e.g., quota, such as quota 630 of FIG. 6) of open segments assigned to a plurality of storage system processes having open segments. A quota (or target ratio of open segments) may refer to a value that is indicative of target ratio of open segments for a particular. In some implementations, the quota may use the target parallelism as a scaling factor.

For example, FIG. 6 illustrates quotas 630 for three different storage system processes 615 that have open segments. It may be noted that idle storage system processes are not shown in FIG. 6 because the idle storage system processes do not have allocated open segments. Quota 630A for storage system process 615A is 7, quota 630B for storage system process 615B is 2, and quota 630C for storage system process 615C is 1. The quota for a storage system process 615 may be assigned by an administrator. For example, a ratio between a quota 630A assigned to the storage system process 615A and an aggregate of quotas 630 assigned to the storage system processes 615 having open segments, may be calculated using quota 630A divided by the sum of quota 630A-C (e.g., ratio=7/(7+2+1)=0.7).

At block 510, processing logic determines a target number of open segments for the storage system. For example, in FIG. 6, the target number of open segments for the storage system is 100 (e.g., target parallelism 625). At block 515, processing logic calculates the allocation share for the storage system process using the ratio and the target number of open segments. For example, in FIG. 6, the allocation share 620A for storage system process 615A is the ratio (0.7), as calculated above, multiplied by the target parallelism 626 of 100 (0.7×100=70). The allocation share 620A for storage system process 615A is 70 open segments. In may be noted that at another given instance, parameters such as open segment usage 610, number of non-idle storage system processes may change, which may lead to an adjustment of the allocation share 620 of any given storage system process. It may be noted that the allocation shares 620 for other storage system processes 615 may be determined in a similar manner as described above.

Returning to the description of FIG. 4, at block 420, processing logic determines whether the open segment usage by the storage system process is under the allocation share for the storage system process.

Responsive to determining an open segment usage by the storage system process is under the allocation share for the storage system process, processing logic moves to block 425 and opens a new segment for the storage system process. For example, in FIG. 6 storage system process 615A has an allocation share 620A of 70. The open segment usage 610 of storage system process 615A is 65 open segments, which is 5 open segments below allocation share 620A. If storage system process 615A is the storage system process that sent the I/O write request, processing logic will grant an open segment (e.g., at least up to 5 open segments) because open segment usage 610 by the storage system process 615A is under the allocation share 620A for the storage system process 615A.

Responsive to determining an open segment usage by the storage system process is not under the allocation share for the storage system process, processing logic moves to block 430 and determines other allocation shares for other storage system processes having open segments. For example, in FIG. 6 if storage system process 615C is the storage system process having sent the I/O write request to write data to the storage system, processing logic would determine that open segment usage 610 of storage system process 615C is 20 open segments, which is above the allocation share 620B (e.g., 10 open segments). Processing logic may determine the allocation shares 620A and 620B for the other storage system processes 615A and 615B are 65 and 15, respectively. Processing logic may determine the allocation shares of the other storage system process in a similar manner as described above. It may be noted that for the sake of clarity, the remaining description of FIG. 4, storage system process 615C is the storage system process that sent the I/O write request and the storage system processes 615A and 615B are the other storage system processes, unless otherwise described.

At block 435, processing logic determines the open segment usage for the other storage system processes, such as storage system process 615A and 615B (e.g., 65 and 15 open segments, respectively). At block 440, processing logic identifies a pool of segments unused by the other storage system processes (e.g., storage system process 615A and 615B) by determining a difference between the other allocation shares (e.g., allocation shares 620A and 620B) and open segment usage 610 for the other storage system processes 615A and 615B. For example, the other storage system processes 615A and 615B each have a difference between allocation shares 620A and 620B and the open segment usage 610 (e.g., 65 and 15 open segments, respectively) of 5 unused open segments. The unused open segments of storage system process 615A and 615B may be added to a pool of open segments.

At block 445, processing logic distributes a new segment from the pool of segments to the storage system process. For example, if new storage system process (not shown) requests additional open segments (e.g., has at least 1 open segment prior to the request), the allocation shares 620 may be recalculated based on the new storage system process. If the new storage system process is under the recalculated allocation share for the new storage system process, the new storage system process may receive some or all the new open segments from the pool of open segments. In other implementations, the pool of open segments may be split between storage system processes that are oversubscribed (e.g., above the calculated allocation share for the particular storage system processes). In some implementations, the pool of open segments may be split evenly between the oversubscribed storage system processes. In other implementations, the pool of open segments may be split between the oversubscribed storage system processes in a ratio of the quotas 630 of the storage system processes. For example if, oversubscribed storage system process 615C with a quota 630C of 1 splits the pool of 10 open segments with a new storage system process (not shown) with a quota of 4, storage system process 615C may get one-fifth (e.g., $\frac{1}{5}=2$ open segments) of the pool of open segments and the new storage system process may get four-fifths (e.g., $\frac{4}{5}=8$ open segments) of the pool of open segments. Storage system process 615C may get an allocation share 620B of 10 open segments plus an additional 2 open segments from the pool of open segments for a total of 12 open segments. It may be noted that the 20 open segments already allocated to storage system process 615C are not taken away from storage system process 615C, but in implementations, storage system process 615C may not get new open segments, unless the storage system undergoes changes in operating parameters, such as changes to the pool of open segments or changes to the allocation share 620C.

Figure 7:
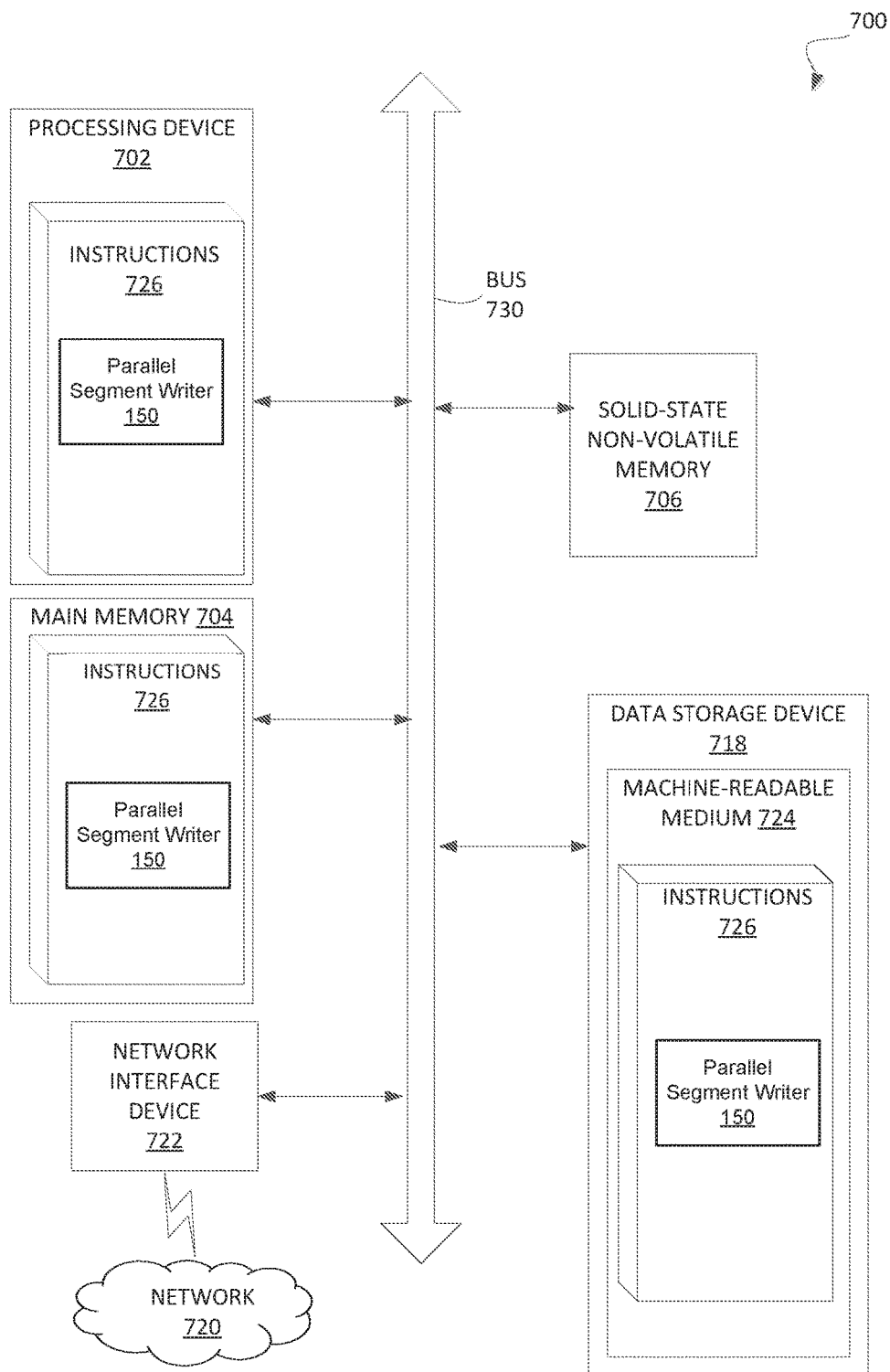
FIG. 7 illustrates an example computer system, in accordance with some implementations.

FIG. 7 depicts an example computer system 700 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a solid-state non-volatile memory 706 (e.g., flash memory, 3D crosspoint memory, magnetoresistive random-access memory (MRAM), or any other such storage media that does not use a physical disk), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute a parallel segment writer 150 for performing any of operations discussed herein. The computer system 700 may further include a network interface device 722. The data storage device 718 may include a computer-readable storage medium 724 on which is stored the parallel segment writer 150 embodying any one or more of the methodologies or functions described herein. The parallel segment writer 150 may also reside, completely or at least partially, within the main memory 704 and/or within the processing device 702 during execution thereof by the computer system 700, the main memory 704 and the processing device 702 also constituting computer-readable media. The parallel segment writer 150 may further be transmitted or received over a network via the network interface device 722.

While the computer-readable storage medium 724 is shown in the illustrative examples to be a single medium, the term "computer-readable storage medium" (e.g., "non-transitory computer-readable storage medium") may be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure may, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adjusting," "determining," "opening," "calculating," "identifying," "distributing," "receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method operations. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable storage medium having stored thereon instructions, which may be used to program a computer system (or other electronic devices) to perform a process according to the present disclosure. A machine-readable storage medium includes any method for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
    adjusting, by a host controller of a storage system during run-time, storage bandwidth for a storage system process responsive to an input output (I/O) write request to write data to the storage system that comprises a plurality of solid-state storage drives by:
        calculating an allocation share for the storage system process requesting to write the data using a target ratio of open segments assigned to the storage system process, a target ratio of open segments assigned to other storage system processes having open segments, and a target number of open segments for the storage system; and
        responsive to determining an open segment usage by the storage system process is under the allocation share for the storage system process, opening a new segment for the storage system process.

2. The method of claim 1, wherein determining the allocation share for the storage system process comprises:
    determining a ratio between a target ratio of open segments assigned to the storage system process and an aggregate of target ratios of open segments assigned to a plurality of storage system processes having open segments;
    determining a target number of open segments for the storage system; and
    calculating the allocation share for the storage system process using the ratio and the target number of open segments.

3. The method of claim 1, wherein adjusting the storage bandwidth for the storage system process further comprises:
    determining whether an open segment usage of the storage system is under a target number of open segments for the storage system; and
    responsive to determining the open segment usage of the storage system is under the target number of open segments for the storage system, opening a new segment for the storage system process.

4. The method of claim 3, wherein determining the allocation share for the storage system process is responsive to determining the open segment usage of the storage system is not under the target number of open segments for the storage system.

5. The method of claim 1, further comprising:
receiving the I/O write request to write data to the storage system from the storage system process;
determining whether the storage system process has an open segment;
responsive to determining the storage system process does not have an open segment, opening a new segment for the storage system process; and
responsive to determining the storage system process does have an open segment, adjusting the storage bandwidth for the storage system process.

6. The method of claim 1, wherein the plurality of solid-state storage drives are flash-based storage drives.

7. The method of claim 1, wherein the host controller is communicatively coupled to the storage drives and resides outside of the storage drive.

8. A method comprising:
adjusting, by a host controller of a storage system during run-time, storage bandwidth for a storage system process responsive to an input output (I/O) write request to write data to the storage system that comprises a plurality of solid-state storage drives by:
determining an allocation share for the storage system process requesting to write the data;
responsive to determining an open segment usage by the storage system process is under the allocation share for the storage system process, opening a new segment for the storage system process;
determining whether the open segment usage by the storage system process is under the allocation share for the storage system process;
responsive to determining the open segment usage by the storage system process is not under the allocation share for the storage system process:
determining other allocation shares for other storage system process having open segments;
determining open segment usage for the other storage system processes;
identifying a pool of open segments unused by the other storage system processes by determining a difference between the other allocation shares and open segment usage for the other storage system processes; and
distributing a new segment from the pool of segments to the storage system process.

9. A storage system comprising:
a memory; and
a host controller, operatively coupled to the memory, to:
adjust, during run-time, storage bandwidth for a storage system process responsive to an input output (I/O) write request to write data to the storage system that comprises a plurality of solid-state storage drives, the host controller to:
determine an allocation share for the storage system process requesting to write the data;
responsive to determining an open segment usage by the storage system process is under the allocation share for the storage system process, open a new segment for the storage system process
determine whether the open segment usage by the storage system process is under the allocation share for the storage system process;
responsive to determining the open segment usage by the storage system process is not under the allocation share for the storage system process, the host controller to:
determine other allocation shares for other storage system process having open segments;
determine open segment usage for the other storage system processes;
identify a pool of open segments unused by the other storage system processes by determining a difference between the other allocation shares and open segment usage for the other storage system processes; and
distribute a new segment from the pool of segments to the storage system process.

10. The storage system of claim 9, wherein to determine the allocation share for the storage system process, the host controller to:
determine a ratio between a target ratio of open segments assigned to the storage system process and an aggregate of target ratios of open segments assigned to a plurality of storage system processes having open segments;
determine a target number of open segments for the storage system; and
calculate the allocation share for the storage system process using the ratio and the target number of open segments.

11. The storage system of claim 9, wherein to adjust the storage bandwidth for the storage system process, the host controller further to:
determine whether an open segment usage of the storage system is under a target number of open segments for the storage system; and
responsive to determining the open segment usage of the storage system is under the target number of open segments for the storage system, open a new segment for the storage system process.

12. The storage system of claim 11, wherein to determine the allocation share for the storage system process is responsive to determining the open segment usage of the storage system is not under the target number of open segments for the storage system.

13. The storage system of claim 9, the host controller further to:
receive the I/O write request to write data to the storage system from the storage system process;
determine whether the storage system process has an open segment;
responsive to determining the storage system process does not have an open segment, open a new segment for the storage system process; and
responsive to determining the storage system process does have an open segment, adjust the storage bandwidth for the storage system process.

14. A non-transitory computer-readable medium that, when executed by a processing device, causes the processing device to:
adjust, by the processing device during run-time, storage bandwidth for a storage system process responsive to an input output (I/O) write request to write data to the storage system that comprises a plurality of solid-state storage drives, the processing device to:
determine an allocation share for the storage system process requesting to write the data;

responsive to determining an open segment usage by the storage system process is under the allocation share for the storage system process, open a new segment for the storage system process determine whether the open segment usage by the storage system process is under the allocation share for the storage system process;

responsive to determining the open segment usage by the storage system process is not under the allocation share for the storage system process, the processing device to:

determine other allocation shares for other storage system process having open segments;

determine open segment usage for the other storage system processes;

identify a pool of open segments unused by the other storage system processes by determining a difference between the other allocation shares and open segment usage for the other storage system processes; and distribute a new segment from the pool of segments to the storage system process.

15. The non-transitory computer-readable medium of claim 14, wherein to determine the allocation share for the storage system process, the processing device to:

determine a ratio between a target ratio of open segments assigned to the storage system process and an aggregate of target ratios of open segments assigned to a plurality of storage system processes having open segments;

determine a target number of open segments for the storage system; and calculate the allocation share for the storage system process using the ratio and the target number of open segments.

16. The non-transitory computer-readable medium of claim 14, wherein to adjust the storage bandwidth for the storage system process, the processing device further to:

determine whether an open segment usage of the storage system is under a target number of open segments for the storage system; and responsive to determining the open segment usage of the storage system is under the target number of open segments for the storage system, open a new segment for the storage system process.

17. The non-transitory computer-readable medium of claim 14, the processing device further to:

receive the I/O write request to write data to the storage system from the storage system process;

determine whether the storage system process has an open segment;

responsive to determining the storage system process does not have an open segment, open a new segment for the storage system process; and responsive to determining the storage system process does have an open segment, adjust the storage bandwidth for the storage system process.

\* \* \* \* \*